United States Patent
John et al.

(10) Patent No.: US 12,497,179 B2
(45) Date of Patent: Dec. 16, 2025

(54) STRETCH SENSOR ASSEMBLY AND METHOD OF ASSEMBLING STRETCH SENSOR ASSEMBLIES FOR EVACUATION SYSTEM INFLATABLES

(71) Applicant: GOODRICH CORPORATION, Charlotte, NC (US)

(72) Inventors: Poly Puthur John, Bangalore (IN); Ashish Kumar Agarwal, Bangalore (IN); Harish Venkateshaiah, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 842 days.

(21) Appl. No.: 17/737,767

(22) Filed: May 5, 2022

(65) Prior Publication Data
US 2023/0286660 A1 Sep. 14, 2023

(30) Foreign Application Priority Data

Mar. 8, 2022 (IN) .............................. 202241012531

(51) Int. Cl.
| | |
|---|---|
| *B64D 25/14* | (2006.01) |
| *G01L 5/102* | (2020.01) |
| *G01L 5/107* | (2020.01) |
| *G01M 5/00* | (2006.01) |
| *G01D 11/24* | (2006.01) |
| *G01D 11/30* | (2006.01) |

(52) U.S. Cl.
CPC .............. *B64D 25/14* (2013.01); *G01L 5/102* (2013.01); *G01L 5/107* (2013.01); *G01M 5/00* (2013.01); *G01D 11/245* (2013.01); *G01D 11/30* (2013.01)

(58) Field of Classification Search
CPC ....... B64D 25/14; G01M 5/00; G01D 11/245; G01D 11/30; G01L 5/102; G01L 5/107
See application file for complete search history.

(56) References Cited

U.S. PATENT DOCUMENTS

| | | | | |
|---|---|---|---|---|
| 1,759,219 | A | * | 5/1930 | Bowlus .................... G01B 5/30 33/787 |
| 3,897,861 | A | * | 8/1975 | Miller .................... B64D 25/14 193/25 B |
| 4,472,883 | A | * | 9/1984 | Ortega .................... G01B 5/30 33/1 H |

(Continued)

FOREIGN PATENT DOCUMENTS

JP 2021105530 A * 7/2021 ............ F16C 17/246

OTHER PUBLICATIONS

European Patent Office, European Office Action dated Feb. 26, 2025 in Application No. 23160190.7.

(Continued)

*Primary Examiner* — Stanton L Krycinski
(74) *Attorney, Agent, or Firm* — SNELL & WILMER L.L.P.

(57) ABSTRACT

A stretch senor assembly may comprise a stretch sensor, a first housing and a second housing. The stretch sensor may include a first mounting end, a second mounting end, and a sensing region extending between the first mounting end and the second mounting end. The first housing may define a connector opening and the first mounting end may be located in the first housing. The second housing may be located around the second mounting end.

5 Claims, 9 Drawing Sheets

(56) References Cited

U.S. PATENT DOCUMENTS

| | | | | |
|---|---|---|---|---|
| 4,526,262 | A * | 7/1985 | Malcolm | B64D 25/14 |
| | | | | 193/25 B |
| 4,567,977 | A * | 2/1986 | Fisher | B64D 25/14 |
| | | | | 193/25 B |
| 4,873,654 | A | 10/1989 | Alexander et al. | |
| 10,486,818 | B2 * | 11/2019 | Volny | A62B 1/20 |
| 10,753,813 | B1 * | 8/2020 | Stork | G01M 13/023 |
| 10,946,971 | B2 * | 3/2021 | John | A62B 1/20 |
| 11,105,660 | B2 * | 8/2021 | Chou | G01D 11/245 |
| 11,572,181 | B2 * | 2/2023 | John | F16K 17/32 |
| 11,828,621 | B2 * | 11/2023 | Shimizu | G06F 1/1658 |
| 2018/0334256 | A1 * | 11/2018 | Haynes | B65D 63/1081 |
| 2019/0112059 | A1 * | 4/2019 | Haynes | B64D 25/14 |
| 2020/0094976 | A1 | 3/2020 | John et al. | |
| 2021/0354835 | A1 | 11/2021 | John et al. | |
| 2022/0402618 | A1 * | 12/2022 | Palaniappan | B64D 45/00 |
| 2024/0353440 | A1 * | 10/2024 | Zimmerman | G06F 3/012 |

OTHER PUBLICATIONS

European Patent Office, European Search Report dated Jul. 5, 2023 in Application No. 23160190.7.

\* cited by examiner

STRETCH SENSOR ASSEMBLY AND METHOD OF ASSEMBLING STRETCH SENSOR ASSEMBLIES FOR EVACUATION SYSTEM INFLATABLES

CROSS-REFERENCE TO RELATED APPLICATIONS

This application claims priority to, and the benefit of, India patent application No. 202241012531, filed Mar. 8, 2022 and titled "STRETCH SENSOR ASSEMBLY AND METHOD OF ASSEMBLING STRETCH SENSOR ASSEMBLIES FOR EVACUATION SYSTEM INFLATABLES," which is incorporated by reference herein in its entirety for all purposes.

FIELD

The present disclosure relates generally to inflatable evacuation systems and, more particularly, to methods and assemblies for coupling stretch sensors to evacuation system inflatables.

BACKGROUND

Inflatable evacuation systems may be found on various structures, including aircraft, boats, offshore drilling platforms, and the like. The systems are typically equipped with an inflatable device, such as, for example, an inflatable slide or an inflatable raft, configured to facilitate rapid evacuation of persons in the event of an emergency. The slides or rafts are typically stored in an uninflated condition on the structure—e.g., a commercial aircraft—in a location readily accessible for deployment.

Systems used to inflate the slide or raft typically employ gas stored within a cylinder or tank at high pressure, which is discharged into the inflatable. Due to changes in the densities of gasses caused by variations in temperature, the volume of gas needed to achieve the desired inflation pressure varies with ambient temperature. Some slides and rafts may also include stretch sensors as part of a closed loop system to control the pressure within the inflatable during the inflation process. Coupling the stretch sensors to the inflatable tends to be a tedious process. Further, the sensors need to be accessible for periodic health checks.

SUMMARY

A stretch assembly is disclosed herein. In accordance with various embodiments, the stretch sensor assembly may comprise a stretch sensor, a first housing, and a second housing. The stretch sensor includes a first mounting end, a second mounting end, and a sensing region extending between the first mounting end and the second mounting end. The first housing may define a connector opening. The first mounting end may be located in the first housing. The second housing may be located around the second mounting end.

In various embodiments, the first mounting end may include sensor circuitry and a sensor electrical connector. In various embodiments, the first housing may include a first housing portion and a second housing portion coupled to the first housing portion. The first housing portion may define a recess configured to receive the first mounting end.

In various embodiments, a printed circuit board may be located in the first housing and electrically connected to the sensor electrical connector. The printed circuit board may include a printed circuit board electrical connector aligned with the connector opening in the first housing.

In various embodiments, a first portion of a first releasable connection may be coupled to the first housing, and a first portion of a second releasable connection may be coupled to the second housing. In various embodiments, the stretch sensor assembly may further comprise a first patch, a second portion of the first releasable connection coupled to the first patch, a second patch, and a second portion of the second releasable connection coupled to the second patch. In various embodiments, each of the first releasable connection and the second releasable connection may comprise a snap fastener.

An evacuation system is also disclosed herein. In accordance with various embodiments, the evacuation system may comprise an evacuation slide including an inflatable tube, and a stretch sensor assembly mounted to the inflatable tube. The stretch sensor assembly may include a stretch sensor, a first housing, and a second housing. The stretch sensor may comprise a first mounting end, a second mounting end, and a sensing region extending between the first mounting end and the second mounting end. The first housing may be coupled to a first location on the inflatable tube. The first housing may define a connector opening and may be located around the first mounting end. The second housing may be coupled to a second location on the inflatable tube and may be located around the second mounting end.

In various embodiments, the stretch senor assembly may further comprise a first patch bonded to the first location on the inflatable tube, a first releasable connection coupled between the first housing and the first patch, a second patch bonded to the second location on the inflatable tube, and a second releasable connection coupled between the second housing and the second patch.

In various embodiments, a first portion of the first releasable connection may be coupled to the first housing and a second portion of the first releasable connection may be coupled to the first patch. A first portion of the second releasable connection may be coupled to the second housing and a second portion of the second releasable connection may be coupled to the second patch.

In various embodiments, a cover may be located over the stretch sensor assembly and attached to the inflatable tube.

In various embodiments, the first mounting end of the stretch sensor may include sensor circuitry and a sensor electrical connector. The stretch sensor assembly may further comprise a printed circuit board located in the first housing and electrically connected to the sensor circuitry via the sensor electrical connector. The printed circuit board may include a printed circuit board electrical connector aligned with the connector opening in the first housing.

In various embodiments, a compressed fluid source may be fluidly coupled to the inflatable tube. A valve assembly may be connected to the compressed fluid source and configured to control a flow of gas to the inflatable tube. A controller may be operably coupled to the valve assembly and configured to send control signals to the valve assembly. The control signals may be configured to cause the valve assembly to translate between a closed position and an open position. The controller may be configured to determine whether to open the valve assembly or close the valve assembly based on stretch data output by the stretch sensor.

In various embodiments, a stretch sensor link may be electrically coupled to the controller and the printed circuit board electrical connector.

In various embodiments, a first adhesive may be bonded to the first housing and to the inflatable tube. A second adhesive may be bonded to the second housing and to the inflatable tube.

A method for assembling a stretch sensor assembly is also disclosed herein. In accordance with various embodiments, the method may comprise the steps of locating a first mounting end of a stretch sensor in a first housing, locating a second mounting end of the stretch sensor in a second housing, coupling the first housing to a first patch, and coupling the second housing to a second patch.

In various embodiments, locating the first mounting end of the stretch sensor in the first housing may comprise locating the first mounting end of the stretch sensor in a first recess defined by a first portion of the first housing, locating a second portion of the first housing over the first mounting end, and locating a first fastener through the first portion of the first housing, the first mounting end, and the second portion of the first housing.

In various embodiments, the method may further comprise electrically connecting a printed circuit board to a sensor electrical connector of the first mounting end and locating the printed circuit board in the first recess with a printed circuit board electrical connector aligned with a connector opening defined by the first portion of the first housing.

In various embodiments, coupling the first housing to the first patch may comprise coupling a first portion of a first releasable connection to the first housing, coupling a second portion of the first releasable connection to the first patch, and coupling the first portion of the first releasable connection to the second portion of the first releasable connection. Coupling the second housing to the second patch may comprise coupling a first portion of a second releasable connection to the second housing, coupling a second portion of the second releasable connection to the second patch, and coupling the first portion of the second releasable connection to the second portion of the second releasable connection.

In various embodiments, the method may further comprise coupling the first patch to a first location on an inflatable tube, coupling the second patch to a second location on the inflatable tube, and locating a cover over the first housing and the second housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of brevity.

The systems and methods disclosed herein may find particular use in connection with aircraft evacuation slides. However, various aspects of the disclosed assemblies and methods may be adapted for performance in a variety of other inflatable assemblies, for example, inflatable raft assemblies, and/or any other assemblies having inflatable structures. As such, numerous applications of the present disclosure may be realized.

Figure 1:
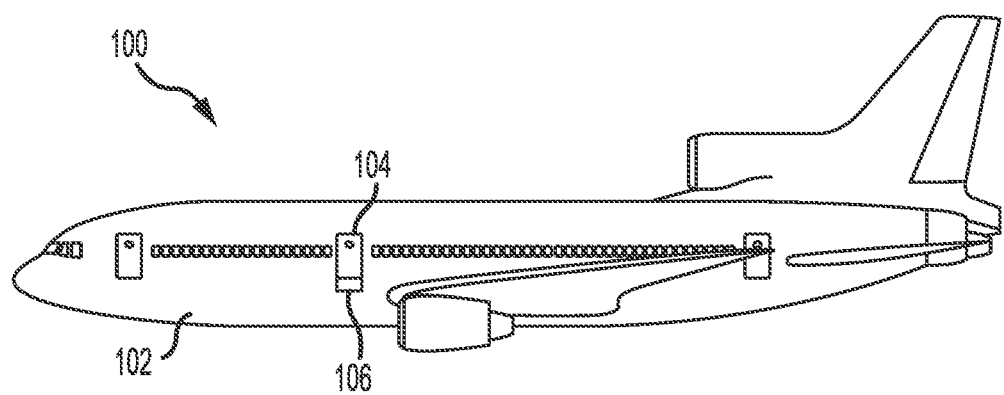
FIG. 1 illustrates an aircraft having an evacuation assembly, in accordance with various embodiments.

Referring now to FIG. 1, an aircraft 100 is shown. Aircraft 100 may include a fuselage 102 having a plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened. It is contemplated and understood that evacuation system 106 may deploy in response to other actions taken by a passenger or crew member such as, for example, depression of a button, actuation of a lever, or the like.

Figure 2:
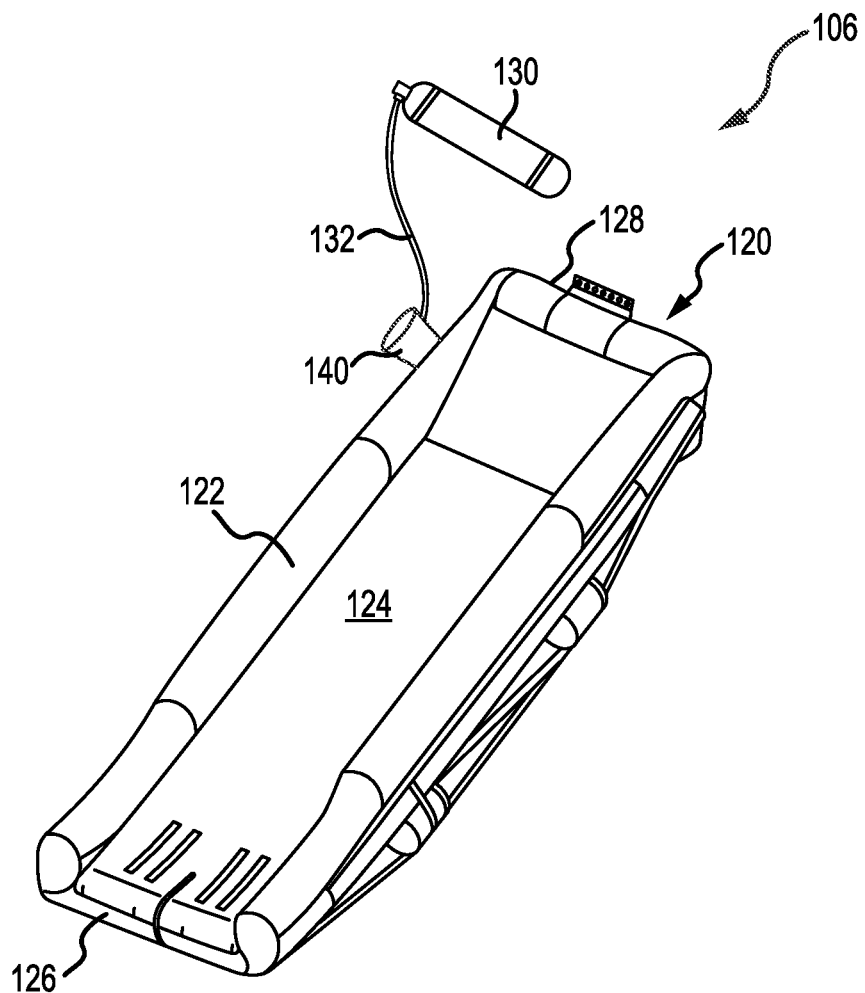
FIG. 2 illustrates an evacuation slide in a deployed position, in accordance with various embodiments.

With reference to FIG. 2, evacuation system 106 is illustrated in a deployed state. In accordance with various embodiments, evacuation system 106 includes an evacuation slide 120 and a compressed fluid source 130 configured to deliver a pressurized gas to inflate evacuation slide 120. In FIG. 2, evacuation slide 120 is in an inflated (i.e., deployed) state. During deployment, an inflatable tube 122 (or a plurality of inflatable tubes) of evacuation slide 120 is inflated using pressurized gas from compressed fluid source 130. Evacuation slide 120 may comprise a sliding surface 124 secured to the inflatable tube 122. Evacuation slide 120 includes a toe end 126 and a head end 128 opposite toe end 126. Head end 128 may be coupled to an aircraft structure (e.g., fuselage 102 in FIG. 1). Sliding surface 124 extends from head end 128 to toe end 126. Evacuation slide 120 is illustrated as a single lane slide. However, evacuation slide 120 may comprise any number of lanes.

Compressed fluid source 130 is fluidly coupled to evacuation slide 120. For example, compressed fluid source 130 may be fluidly coupled to inflatable tube 122 via a hose, or conduit, 132. In various embodiments, evacuation system 106 may include an aspirator 140 fluidly coupled between compressed fluid source 130 and evacuation slide 120. Aspirator 140 is configured to entrain ambient air with gas output from compressed fluid source 130. For example, in response to deployment of evacuation slide 120, the gas from compressed fluid source 130 flows into aspirator 140 and causes aspirator 140 to draw in ambient air from the environment. The combination of the gas flow from compressed fluid source 130 and the environmental gas is then directed into evacuation slide 120, thereby inflating inflatable tube 122.

Figure 3:
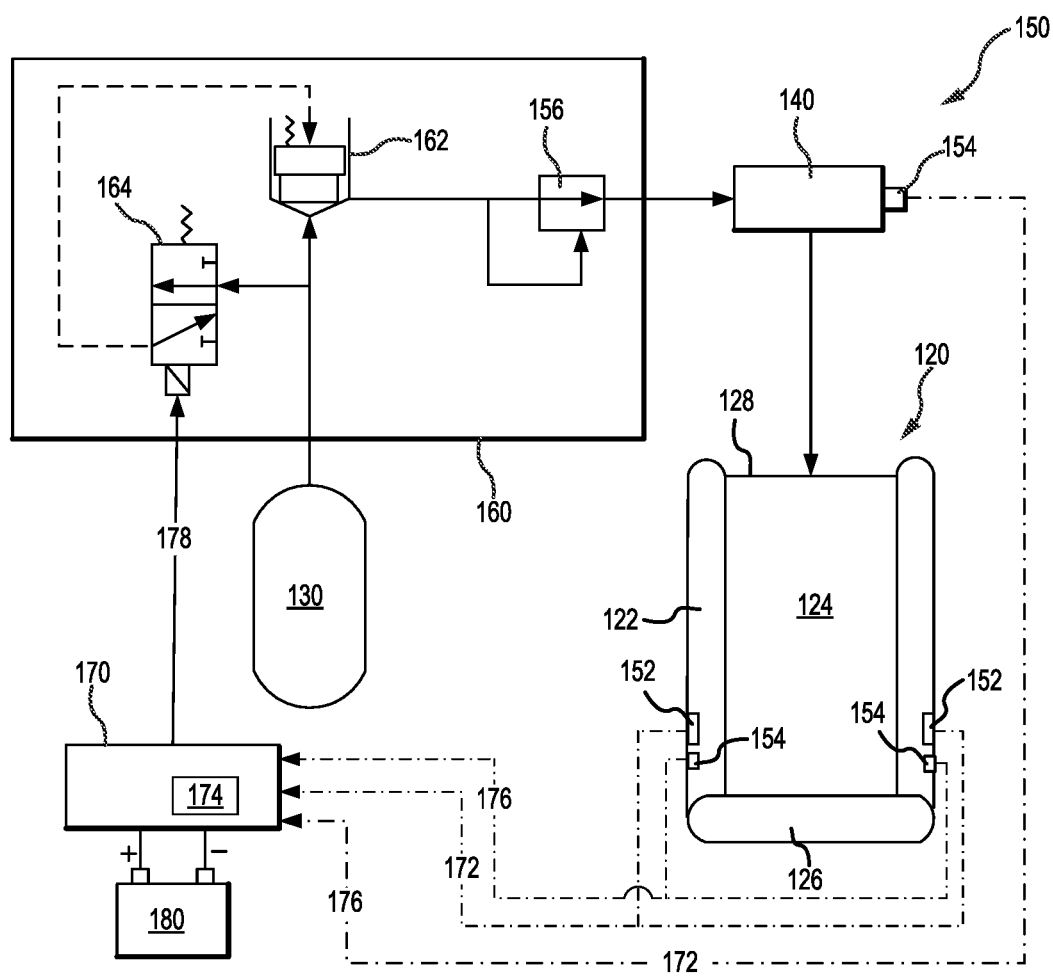
FIG. 3 illustrates a schematic of an inflation control system, in accordance with various embodiments.

Referring now to FIG. 3, an inflation control system 150 of evacuation system 106 is illustrated. In accordance with various embodiments, inflation control system 150 is configured to control inflation of evacuation slide 120. Inflation control system 150 includes one or more stretch sensor assemblies 152 configured to monitor the inflation of evacuation slide 120. Stretch sensor assemblies 152 may be mounted on the inflatable tube 122 of evacuation slide 120. Stretch sensor assemblies 152 are configured to monitor an elastic stretch or an elastic deformation of the fabric that forms inflatable tube 122 during the inflation process. Real-time data output by stretch sensor assemblies 152 and correlating to the elastic stretch experienced by the inflatable tube 122 (referred to herein as stretch data) may be sent to a controller 170 during the inflation process. In various embodiments, the real-time stretch data from the stretch sensor assemblies 152 may be sent to controller 170 via one or more stretch sensor link(s) 172. In various embodiments, power may also be provided to stretch sensor assemblies 152 via stretch sensor link(s) 172. As described in further detail below, controller 170 employs the real-time stretch data to control the inflation of evacuation slide 120.

In various embodiments, the controller 170 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof. A tangible, non-transitory computer-readable storage medium 174 may be in communication with controller 170. Storage medium 174 may comprise any tangible, non-transitory computer-readable storage medium known in the art. The storage medium 174 has instructions stored thereon that, in response to execution by controller 170, cause controller 170 to perform operations related to controlling the inflation of evacuation slide 120.

In accordance with various embodiments, inflation control system 150 further includes a valve assembly 160, compressed fluid source 130, which is filled with a high-pressure gas (or, in various embodiments, a gas generator configured to generate a high-pressure gas), aspirator 140, controller 170, and a power source 180, such as, for example, a battery or charged capacitor. In various embodiments, the power source 180 is a dedicated power source configured to power the stretch sensor assemblies 152, the temperature sensors 154, as well as each of the valve assembly 160 and the controller 170. To provide a dedicated source of current power, the power source 180 may comprise, for example, a lithium-ion battery or an ultracapacitor, each configured to store energy at a high density for controlling the rapid sequence of events that occur during an inflation process of the evacuation slide 120. In various embodiments, one or more of stretch sensor assemblies 152, temperature sensors 154, valve assembly 160, and/or the controller 170 may receive power from an aircraft power source.

In various embodiments, inflation control system 150 may further include one or more temperature sensors 154 configured to sense or monitor the ambient temperature during the inflation process. In various embodiments, at least one temperature sensor 154 is coupled to aspirator 140 and at least one temperature sensor 154 is coupled to evacuation slide 120. Temperature sensors 154 may output real-time temperature measurements to controller 170. Real-time data from the temperature sensors 154 (i.e., real-time temperature measurements) may be sent to controller 170 via a temperature sensor link 176. Temperature sensor link(s) 176 may provide wired or wireless communication between temperature sensors 154 and controller 170. In various embodiments, controller 170 may be configured to the make decisions regarding the inflation of evacuation slide 120 based on the real-time temperature measurements and the real-time stretch data.

In accordance with various embodiments, the valve assembly 160 is configured to open and close a main pneumatic valve 162 based on control signals 178 received from the controller 170. More specifically, based on preset control logic and the real-time data received from the stretch sensor assemblies 152, controller 170 actuates the main pneumatic valve 162 in order to turn on or turn off the flow of high-pressure gas from the compressed fluid source 130 to the inflatable tube 122. In various embodiments, the valve assembly 160 may further comprise a control valve 164 configured to operate the main pneumatic valve 162 between an open position and a closed position. In various embodiments, the valve assembly 160 may also include a pressure regulator valve 156 configured to prevent the occurrence of an over-pressure situation at the aspirator 140 or the inflatable tube 122.

In various embodiments, control valve 164 may be an open valve, such as, for example, a three-way, two-position open solenoid valve, and main pneumatic valve 162 may be a closed poppet valve. In this regard, energizing control valve 164 (i.e., providing electric current to control valve 164), opens the main pneumatic valve 162, thereby allowing fluid from compressed fluid source 130 to flow through aspirator 140 and into evacuation slide 120. De-energizing control valve 164 (i.e., stopping the flow of electric current to control valve 164) closes main pneumatic valve 162, thereby blocking or otherwise preventing the flow of fluid from compressed fluid source 130 to aspirator 140 and evacuation slide 120.

Figure 4A:
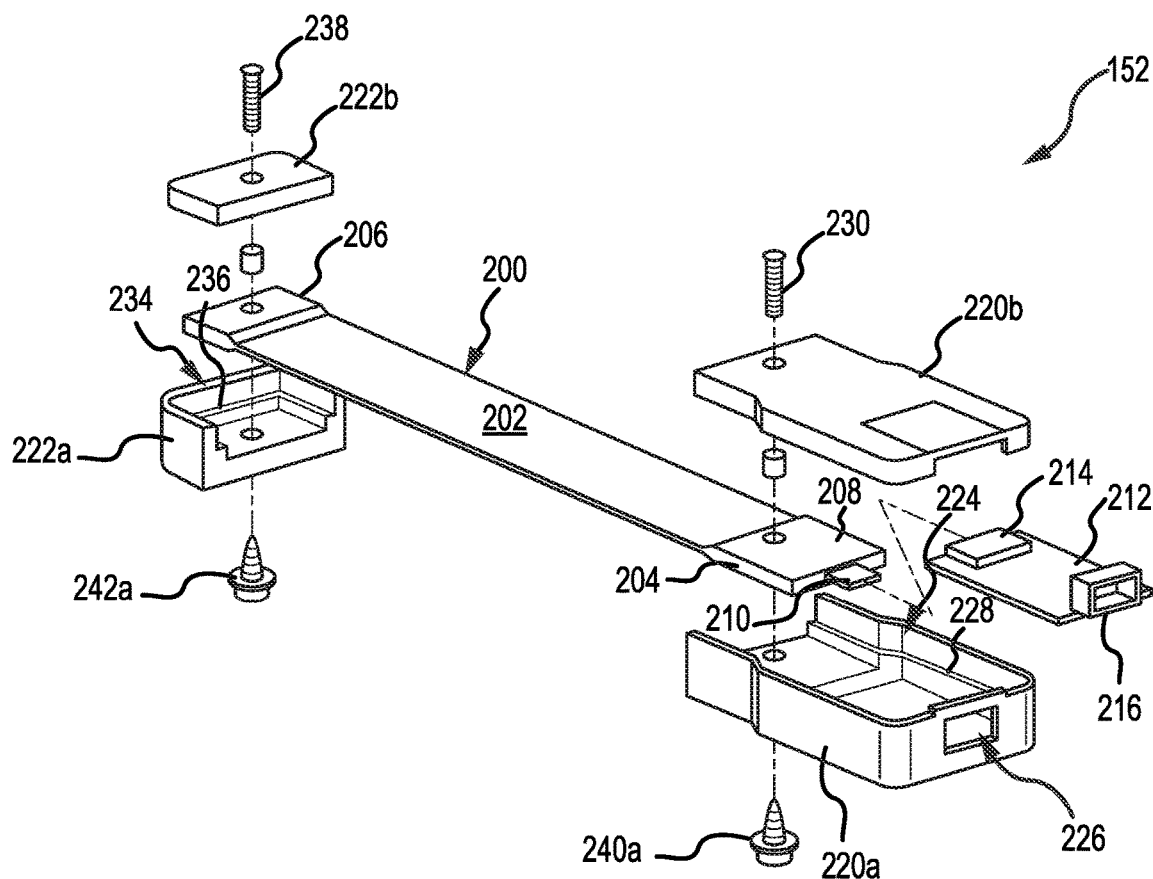
FIGS. 4A and 4B illustrate an exploded view and an assembled view, respectively, of a stretch sensor assembly, in accordance with various embodiments.
Figure 4B:
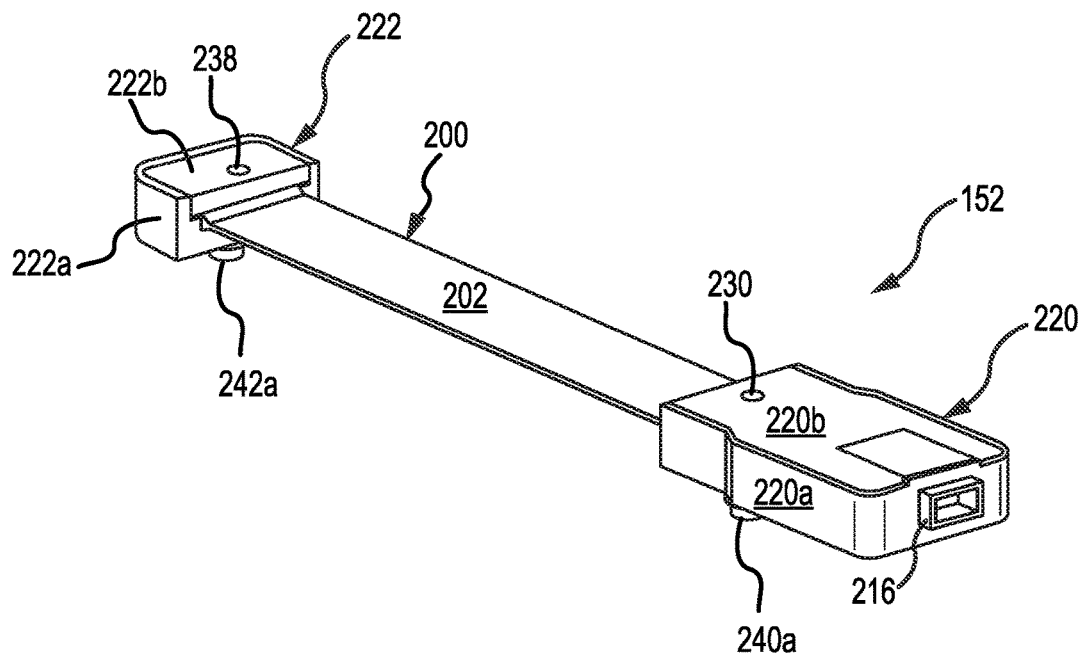

With reference to FIGS. 4A and 4B, an exploded view and an assembled view of a stretch sensor assembly 152 is shown, in accordance with various embodiments. Stretch sensor assembly 152 includes stretch sensor 200. Stretch sensor 200 includes sensing region 202, a first mounting end 204, and a second mounting end 206. Sensing region 202 extends from first mounting end 204 to second mounting end 206. In various embodiments, sensing region 202 may be configured as a flexible parallel plate capacitor. First mounting end 204 may include sensor circuitry 208 and a sensor electrical connector 210.

Stretch sensor assembly 152 further includes a sensor printed circuit board (PCB) 212. Sensor PCB 212 includes a PCB electrical connector 214 (e.g., a first PCB electrical connector 214) configured to mate with sensor electrical connector 210. Stated differently, PCB electrical connector 214 is configured to electrically connect to sensor electrical connector 210, thereby electrically connecting the sensor circuitry 208 with the circuitry and/or electoral components of sensor PCB 212. Sensor PCB 212 includes a PCB electrical connector 216 (e.g., a second PCB electrical connector 216). PCB electrical connector 216 is configured to mate with a link electrical connector 218 (FIG. 5A) of stretch sensor link 172. Stated differently, PCB electrical connector 216 is configured to electrically connect to link electrical connector 218, thereby electrically connecting the circuitry and/or electrical components of sensor PCB 212 with stretch sensor link 172.

Stretch sensor assembly 152 further includes a first housing 220 and a second housing 222. First housing 220 includes a first housing first portion 220a and a first housing second portion 220b. Second housing 222 includes a second housing first portion 222a and a second housing second portion 222b. First portion 220a of first housing 220 defines a recess 224 configured to receive first mounting end 204 and sensor PCB 212. In various embodiments, first portion 220a of first housing 220 defines a connector opening 226 configured to align with and/or receive PCB electrical connector 216. In this regard, PCB electrical connector 216 of sensor PCB 212 may be located through connector opening 226. In various embodiments, an end of PCB electrical connector 216 may extend from (e.g., extend past) the surface defining connector opening 226. In various embodiments, the end of PCB electrical connector 216 may be flush, or slightly recessed, with respect to the surface defining connector opening 226. In various embodiments, a sealant may be located in the area between first portion 220a of first housing 220 and PCB electrical connector 216 to protect the circuitry located within first housing 220 from the external elements (e.g., to protect first mounting end 204 and sensor PCB 212). For example, the area between first portion 220a and PCB electrical connector 216 may be filled (e.g., sealed) with a room temperature vulcanizing (RTV) compound, such as RTV silicon sealant(s).

In various embodiments, first portion 220a of first housing 220 may receive second portion 220b. For example, first portion 220a may include a lip 228 extending from an internal surface of first portion 220a, and second portion 220b may rest on, or otherwise contact, the lip 228. A first fastener 230 may extend through second portion 220b, first mounting end 204, and first portion 220a, thereby securing second portion 220b and first mounting end 204 to first portion 220a. In various embodiments, an electrical insulator, such as a plastic bushing or plastic sleeve, may be located around first fastener 230 to electrically isolate first mounting end 204 from first fastener 230. Stated differently, an electrical insulator may be located between first fastener 230 and first mounting end 204. In various embodiments, a sealant may be located at the interface between first portion 220a and second portion 220b of first housing 220 to protect the circuitry located within first housing 220 from external elements. For example, the interface between first portion 220a and second portion 220b may be filled (e.g., sealed) with a RTV compound, such as RTV silicon sealant(s).

First portion 222a of second housing 222 defines a recess 234 configured to receive second mounting end 206. First portion 222a may also receive second portion 222b. For example, first portion 222a may include a lip 236 extending from an internal surface of first portion 222a, and second portion 222b may rest on, or otherwise contact, the lip 236. A second fastener 238 may extend through second portion 222b, second mounting end 206, and first portion 222a, thereby securing second portion 222b and second mounting end 206 to first portion 222a. In various embodiments, an electrical insulator, such as a plastic bushing or plastic sleeve, may be located around second fastener 238 to electrically isolate second mounting end 206 from second fastener 238. Stated differently, an electrical insulator may be located between second fastener 238 and second mounting end 206. In various embodiments, a sealant may be located at the interface between first portion 222a and second portion 222b to protect second mounting end 206 from external elements. For example, the interface between first portion 222a and second portion 222b may be filled (e.g., sealed) with a RTV compound, such as RTV silicon sealant(s).

In accordance with various embodiments, a first portion 240a of a first releasable connection 240 (FIG. 5B) is coupled to first portion 220a of first housing 220. As described in further detail below, first portion 240a is releasably coupled to a second portion 240b of first releasable connection 240 (FIG. 5B). In various embodiments, first portion 240a may be coupled to first portion 220a of first housing 220 via threaded engagement between first portion 240a of first releasable connection 240 and first portion 220a of first housing 220.

In accordance with various embodiments, a first portion 242a of a second releasable connection 242 (FIG. 5B) is coupled to first portion 222a of second housing 222. As described in further detail below, first portion 242a is releasably coupled to a second portion 242b of second releasable connection 242 (FIG. 5B). In various embodiments, first portion 242a may be coupled to first portion 222a of second housing 222 via threaded engagement between first portion 242a of second releasable connection 240 and first portion 222a of second housing 222.

Figure 5A:
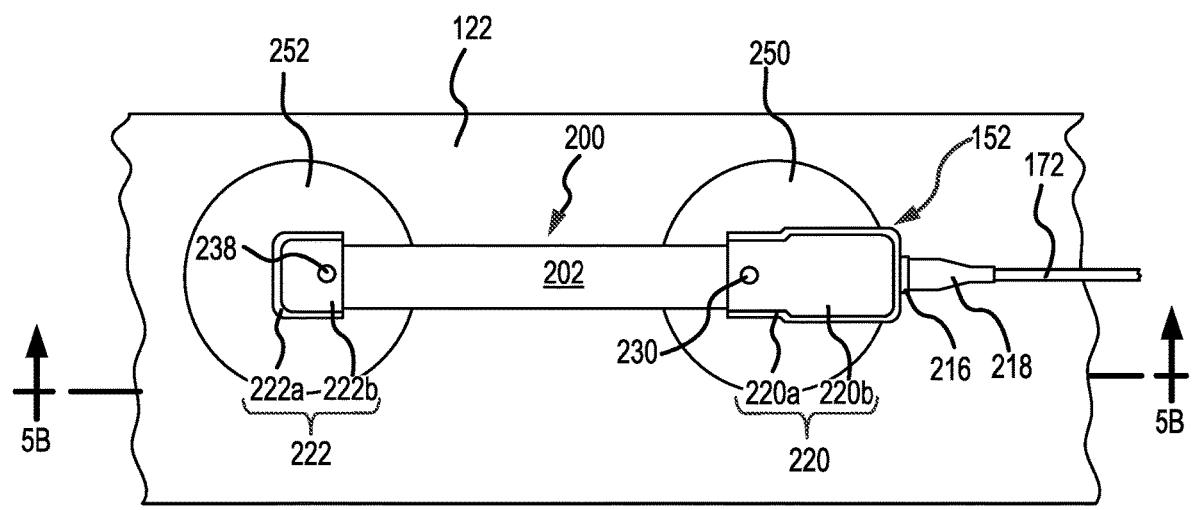
FIGS. 5A and 5B illustrate a top view and a side view, respectively, of a stretch sensor assembly coupled to an inflatable tube, in accordance with various embodiments.
Figure 5B:
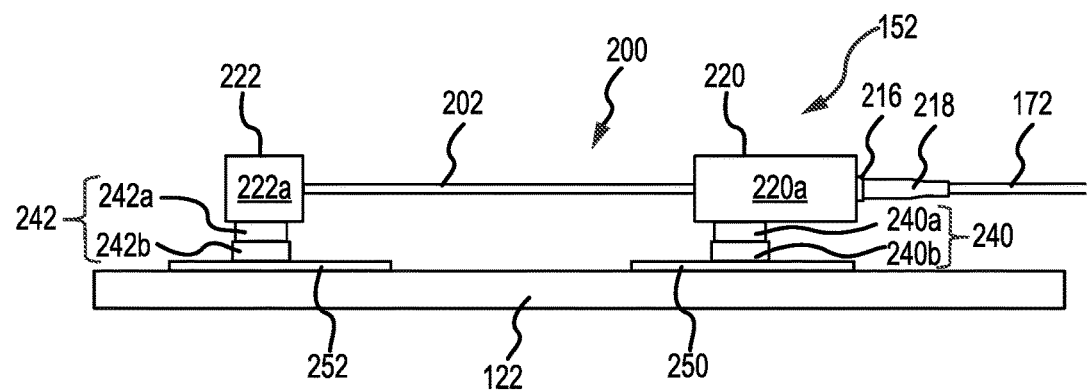

With reference to FIGS. 5A and 5B, a plan view and a side view, respectively, of a stretch sensor assembly 152 mounted to inflatable tube 122 is illustrated, according to various embodiments. In accordance with various embodiments, stretch sensor assembly 152 may further include a first patch 250. First housing 220 is releasably coupled to first patch 250 via first releasable connection 240. In this regard, first portion 240a of first releasable connection 240 is coupled to first housing first portion 220a, and second portion 240b of first releasable connection 240 is coupled to first patch 250. In various embodiments, first releasable connection 240 comprises a snap fastener. In this regard, first portion 240a of first releasable connection 240 may be a stud of the snap fastener or a socket of the snap fastener and second portion 240b of first releasable connection 240 is the other of the stud or the socket of the snap fastener.

In accordance with various embodiments, stretch sensor assembly 152 may further include a second patch 252. Second housing 222 is releasably coupled to second patch 252 via second releasable connection 242. In this regard, first portion 242a of second releasable connection 242 is coupled to second housing first portion 222a and second portion 242b of second releasable connection 242 is coupled to second patch 252. In various embodiments, second releasable connection 242 comprises a snap fastener. In this regard, first portion 242a of second releasable connection 242 may be a stud of the snap fastener or a socket of the snap fastener and second portion 242b of second releasable connection 242 is the other of the stud or the socket of the snap fastener. While first releasable connection 240 and second releasable connection 242 are described as snap fasteners, the present disclosure is not limited in this regard. For example, in various embodiments, first releasable connection 240 may comprise a hook and loop fasteners, clips, tape, or any other releasable fastening system. First releasable connection 240 and second releasable connection 242 allow stretch sensor assembly 152 to be easily removed from inflatable tube 122 to check a health of stretch sensor assembly 152 and/or to replace stretch sensor assembly 152 and/or to replace one of more components of stretch sensor assembly 152.

In accordance with various embodiments, first patch 250 and second patch 252 are each coupled to inflatable tube 122. In various embodiments, the material of each of first patch 250 and second patch 252 is the same as the material of inflatable tube 122. In various embodiments, first patch 250 and second patch 252 may be bonded to inflatable tube 122 via an adhesive (e.g., a polyurethane, polyurea, epoxy, and/or polyimide adhesive). In various embodiments, first patch 250 and second patch 252 may be bonded to inflatable tube 122 using radio frequency (RF) welding, hot gas (e.g., hot air) welding, laser welding, or any other suitable bonding process. Employing RF, hot gas, and/or laser welding to attached first and second patches 250, 252 may allow for elimination of solvents during the bonding process.

Figure 5C:
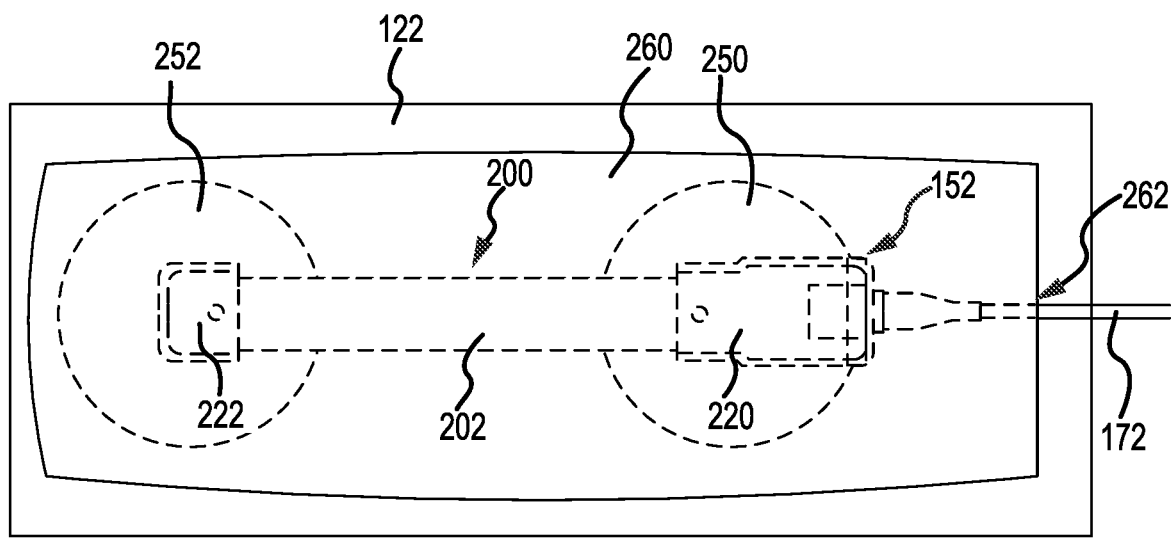
FIG. 5C illustrates a top view of a cover located over a stretch sensor assembly coupled to an inflatable tube, in accordance with various embodiments.

With reference to FIG. 5C, in various embodiments, a cover 260 may be located over stretch sensor assembly 152. Cover 260 may be configured to cover stretch sensor assembly 152. For example, cover 260 may cover stretch sensor 200 and first and second housings 220, 222 of stretch sensor assembly. In this regard, stretch sensor assembly 152 is located between cover 260 and inflatable tube 122. Cover 260 may be attached to inflatable tube 122 via adhesive, radio frequency welding, hot gas welding, laser welding, or any other suitable bonding method. In various embodiments, the bond between cover 260 and inflatable tube 122 may form a sealing interface between cover 260 and inflatable tube 122. The sealing interface may prevent outside elements (water, dirt, debris, etc.) from entering the space between cover 260 and inflatable tube 122, thereby protecting stretch sensor assembly 152 from outside elements. In various embodiments, cover 260 may be attached to inflatable tube 122 via, hook and loop fasteners, tape, or any other suitable attachment means. In various embodiments, the material of cover 260 may be the same as the material of inflatable tube 122. In various embodiments, stretch sensor link 172 extends through a link opening 262 defined between cover 260 and inflatable tube 122. In various embodiments, a sealant may be located in link opening 262. For example, the area between stretch sensor link 172 and cover 260 and between stretch sensor link 172 and inflatable tube 122 may be filled (e.g., sealed) with a RTV compound, such as RTV silicon sealant(s).

The stretch sensor assembly 152 is configured to protect the stretch sensor 200. For example, first housing 220 and second housing 222 protect various electrical interfaces of stretch sensor 200. In this regard, first and second mounting ends 204, 206 of stretch sensor are protected from exposure to the external environment. Further, stretch sensor assembly 152 can be easily removed from inflatable tube 122 and/or dismantled for periodical health checkups of the stretch sensor 200.

Figure 6A:
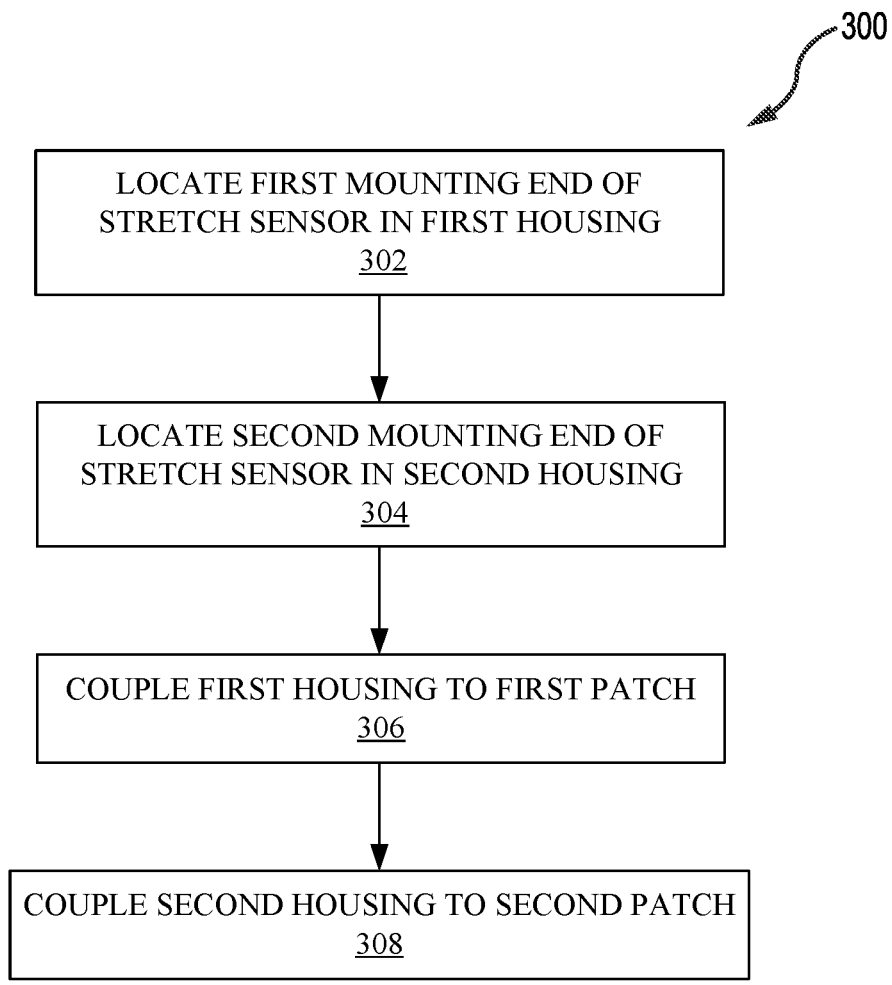
FIGS. 6A, 6B, and 6C illustrate a method for assembling a stretch sensor assembly, in accordance with various embodiments.

With reference to FIG. 6A, a method 300 for assembling a stretch sensor assembly is illustrated. In accordance with various embodiments, method 300 may comprise locating a first mounting end of a stretch sensor in a first housing (step 302), locating a second mounting end of the stretch sensor in a second housing (step 304), coupling the first housing to a first patch (step 306), and coupling the second housing to a second patch (step 308).

Figure 6B:
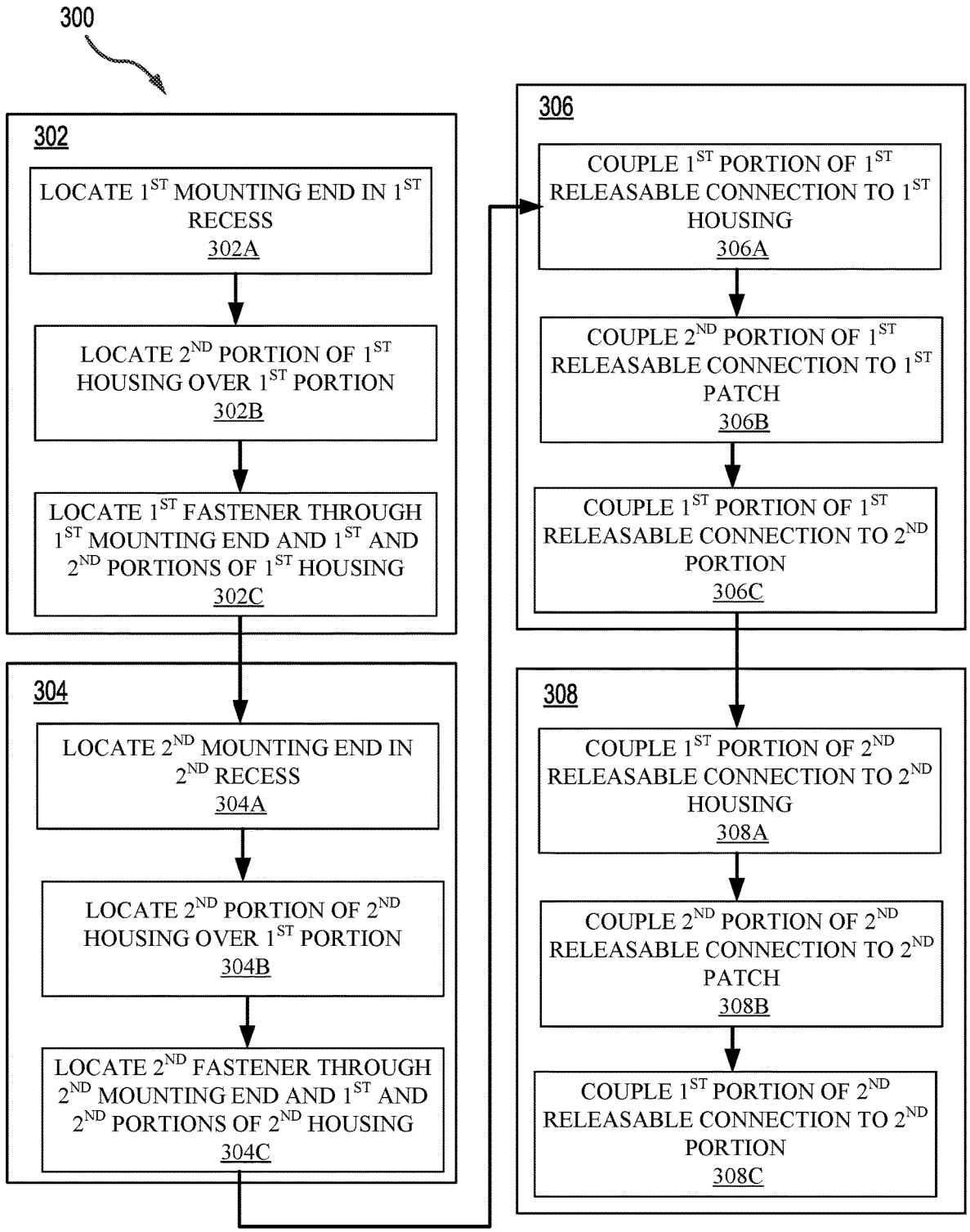

With reference to FIG. 6B, in various embodiments, step 302 may include locating the first mounting end of the stretch sensor in a first recess defined by a first portion of the first housing (step 302A), locating a second portion of the first housing over the first mounting end (step 302B), and locating a first fastener through the first portion of the first housing, the first mounting end, and the second portion of the first housing (step 302C).

In various embodiments, step 304 may include locating the second mounting end of the stretch sensor in a second recess defined by a first portion of the second housing (step 304A), locating a second portion of the second housing over the second mounting end (step 304B), and locating a second fastener through the first portion of the second housing, the second mounting end, and the second portion of the second housing (step 304C).

In various embodiments, step 306 may include coupling a first portion of a first releasable connection to the first housing (step 306A), coupling a second portion of the first releasable connection to the first patch (step 306B), and coupling the first portion of the first releasable connection to the second portion of the first releasable connection (step 306C). In various embodiments, step 308 may include coupling a first portion of a second releasable connection to the second housing (step 308A), coupling a second portion of the second releasable connection to the second patch (step 306B), and coupling the first portion of the second releasable connection to the second portion of the second releasable connection (step 306C).

Figure 6C:
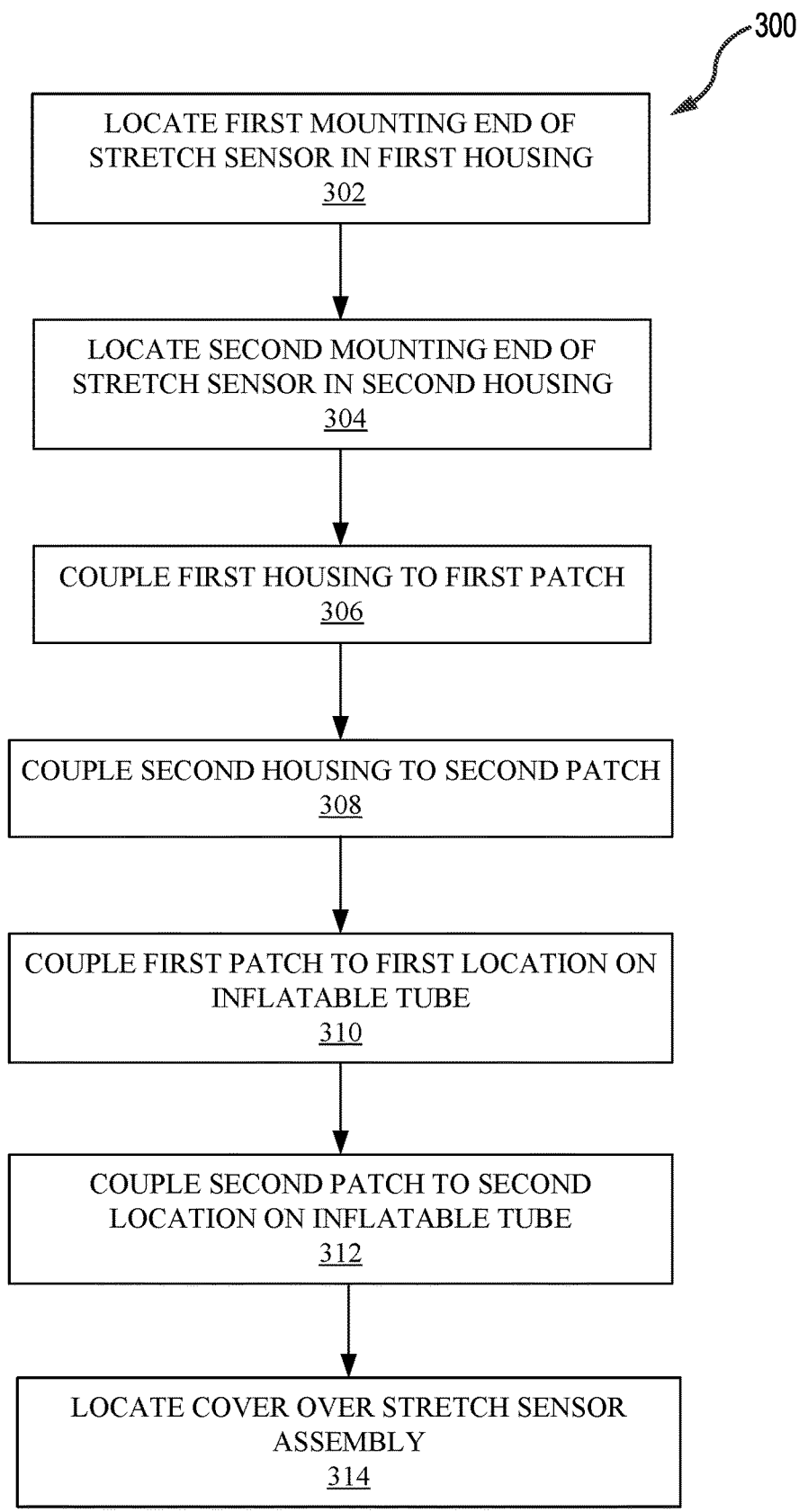

With reference to FIG. 6C, in various embodiments, method 300 may further comprise coupling the first patch to a first location on an inflatable tube (step 310), coupling the second patch to a second location on the inflatable tube (step 312), and locating a cover over the first housing and the second housing (step 314).

In various embodiments, method 300 may further comprise electrically connecting a printed circuit board to a sensor electrical connector of the first mounting end and locating the printed circuit board in the first recess with a printed circuit board electrical connector aligned with a connector opening defined by the first portion of the first housing. In various embodiments, the printed circuit board may be connected to the sensor electrical connector prior to step 302 such that during step 302 the first mounting end the printed circuit board are located in the first recess together (e.g., simultaneously). In various embodiments, the printed circuit board may be located in the first recess prior to step 302. In this regard, the sensor electrical connector may be electrically connected to the printed circuit board with the printed circuit board located in the first recess. In various embodiments, method 300 may further include electrically coupling a stretch sensor link to printed circuit board electrical connector. In various embodiments, step 314 may be performed after connecting the stretch sensor link to printed circuit board electrical connector.

Figure 7A:
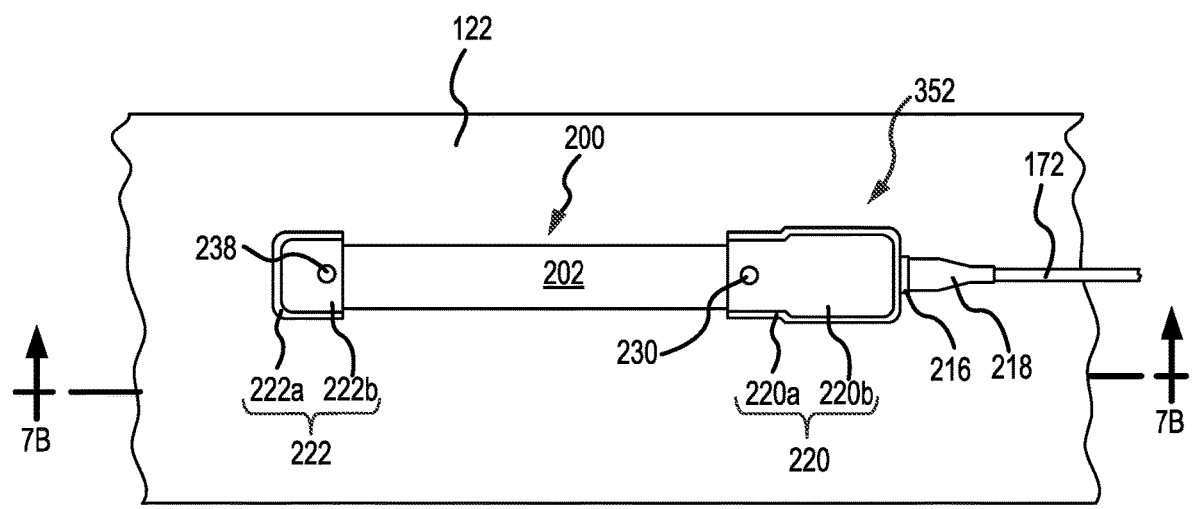
FIGS. 7A and 7B illustrate a top view and a side view, respectively, of a stretch sensor assembly coupled directly to an inflatable tube, in accordance with various embodiments.
Figure 7B:
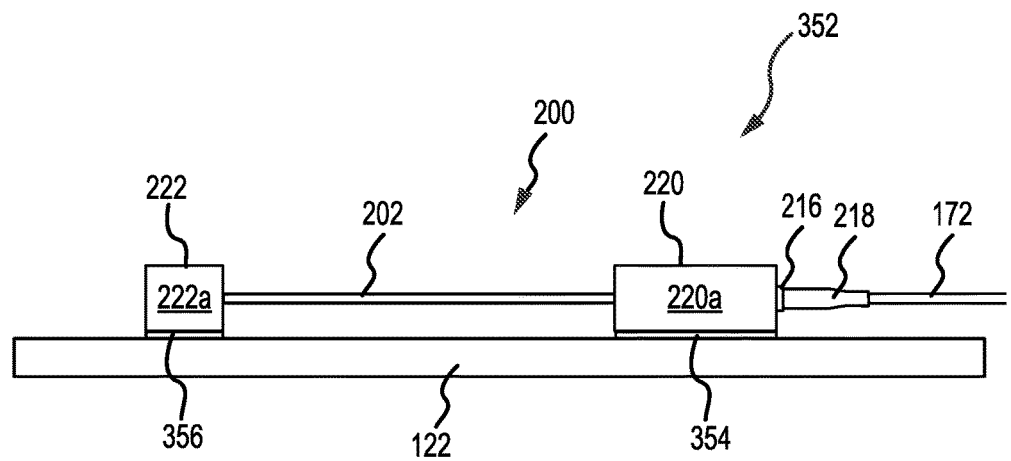

With reference to FIGS. 7A and 7B, a plan view and a side view, respectively, of a stretch sensor assembly 352 mounted to inflatable tube 122 is illustrated, according to various embodiments. In accordance with various embodiments, stretch sensor assembly 352 includes stretch sensor 200, first housing 220, and second housing 222, as described above. In accordance with various embodiments, first housing 220 and second housing 222 may each be coupled directly to inflatable tube 122. For example, a first adhesive 354 may be bonded to first portion 220a of first housing 220 and to inflatable tube 122, and a second adhesive 356 may be bonded to first portion 222a of second housing 222 and to inflatable tube 122. First adhesive 354 may be the same type of adhesive as second adhesive 356. First and second adhesives 354, 356 may comprise a polyurethane adhesive, polyurea adhesive, epoxy adhesive, polyimide adhesive, and/or any other adhesive capable of bonding first and second housings 220, 222 to inflatable tube 122. In various embodiments, cover 260 (FIG. 5C) may be located over stretch sensor assembly 352.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stretch senor assembly, comprising:
   a stretch sensor including a first mounting end, a second mounting end, and a sensing region extending between the first mounting end and the second mounting end, wherein the first mounting end includes sensor circuitry and a sensor electrical connector;
   a first housing defining a connector opening, the first mounting end being located in the first housing;
   a second housing located around the second mounting end; and
   a printed circuit board located in the first housing and electrically connected to the sensor electrical connector, the printed circuit board including a printed circuit board electrical connector aligned with the connector opening in the first housing.

2. The stretch senor assembly of claim 1, wherein the first housing includes a first housing portion and a second housing portion coupled to the first housing portion, the first housing portion defining a recess configured to receive the first mounting end.

3. The stretch senor assembly of claim 1, further comprising:
   a first portion of a first releasable connection coupled to the first housing; and
   a first portion of a second releasable connection coupled to the second housing.

4. The stretch senor assembly of claim 3, further comprising:
   a first patch;
   a second portion of the first releasable connection coupled to the first patch;
   a second patch; and
   a second portion of the second releasable connection coupled to the second patch.

5. The stretch senor assembly of claim 4, wherein each of the first releasable connection and the second releasable connection comprises a snap fastener.

* * * * *